(12) United States Patent
Seidman et al.

(10) Patent No.: US 6,671,358 B1
(45) Date of Patent: Dec. 30, 2003

(54) METHOD AND SYSTEM FOR REWARDING USE OF A UNIVERSAL IDENTIFIER, AND/OR CONDUCTING A FINANCIAL TRANSACTION

(75) Inventors: Charles B. Seidman, Merion, PA (US); Daniel M. Sossaman, II, Penn Valley, PA (US)

(73) Assignee: Universal Identity Technologies, Inc., Merion, PA (US)

( * ) Notice: Subject to any disclaimer, the term of this patent is extended or adjusted under 35 U.S.C. 154(b) by 0 days.

(21) Appl. No.: 10/125,148

(22) Filed: Apr. 18, 2002

Related U.S. Application Data

(60) Provisional application No. 60/286,309, filed on Apr. 25, 2001.

(51) Int. Cl.[7] .............................................. H04M 11/00
(52) U.S. Cl. ............................... 379/93.12; 379/91.01; 705/26
(58) Field of Search ........................... 379/93.12, 93.13, 379/93.05, 93.06, 93.07, 93.08, 93.17, 93.24, 91.01; 235/380; 705/14, 26

(56) References Cited

U.S. PATENT DOCUMENTS

| | | |
|---|---|---|
| 5,007,641 A | 4/1991 | Seidman |
| 5,080,364 A | 1/1992 | Seidman |
| 5,608,786 A | 3/1997 | Gordon |
| 5,791,991 A | 8/1998 | Small |
| 6,067,350 A | 5/2000 | Gordon |
| 2002/0062249 A1 * | 5/2002 | Iannacci ...................... 705/14 |

OTHER PUBLICATIONS

OneName Corporation, www.onename.com/ie/pages/wp_hwaw.html, Mar. 20, 2001, 8 pp.

Orenstein, David, "One Person, One Number", Business2.0; Feb. 2001, 2 pp.

* cited by examiner

*Primary Examiner*—Melur Ramakrishnaiah
(74) *Attorney, Agent, or Firm*—Kirk D. Houser; Eckert Seamans Cherin & Mellott, LLC

(57) ABSTRACT

A method for conducting a financial transaction corresponding to a good or service includes providing a plurality of first credit or debit devices; associating a universal identifier with each of the first credit or debit devices; associating one of the first credit or debit devices with a plurality of second credit or debit cards; employing the one of the first credit or debit devices to initiate the financial transaction; selecting one of the second credit or debit cards based upon the unique identifier and the good or service; and employing the selected one of the second credit or debit cards to conclude the financial transaction.

15 Claims, 10 Drawing Sheets

US 6,671,358 B1

METHOD AND SYSTEM FOR REWARDING USE OF A UNIVERSAL IDENTIFIER, AND/OR CONDUCTING A FINANCIAL TRANSACTION

CROSS REFERENCE TO RELATED APPLICATION

This application claims the benefit of U.S. Provisional Application Ser. No. 60/286,309, filed Apr. 25, 2001.

BACKGROUND OF THE INVENTION

1. Field of the Invention

This invention relates to methods and systems for rewarding users and, more particularly, to methods and systems for rewarding users of universal identifiers. The invention also relates to methods and systems for conducting a financial transaction and, more particularly, to credit or debit card systems for purchasing or leasing goods and services by employing a universal identifier.

2. Background Information

U.S. Pat. Nos. 5,007,641 and 5,080,364 disclose a gaming method in which prizes are automatically awarded upon presentation of tokens bearing machine-readable codes. The tokens may be identical to tokens bearing a common code, and the prizes may be awarded at random to patrons who present an appropriate token bearing this common code.

U.S. Pat. No. 5,791,991 discloses an interactive consumer product promotion method and match game.

U.S. Pat. No. 5,608,786 discloses a unified messaging system and method, which makes use of existing communication channels or networks. Part of the system and method employs a data communication network forming an intermediate leg of a distribution network. Telephone communication is typically used for the initial or final legs of that network. Voice mail, e-mail, facsimiles and other message types are received by the system for retrieval by the subscriber. Communications are centralized and remote retrieval of messages is provided. In turn, data communication networks, such as the Internet, are employed for global voice mail and facsimile mail applications.

U.S. Pat. No. 6,067,350 discloses a "UniPost" commercial access provider of the type associated with Internet, which provides dial-in access to its subscribers through specialized access computers called UniPost Access Nodes (UANs), which are located in different geographical regions. Each UAN provides a subscriber with an e-mail address and account, an Internet address, a personal mailbox telephone number, and a personal ID number (PIN). The UAN provides the subscriber with access to all normal facilities of the Internet, including e-mail, databases, conferences, and forums. The personal mailbox number provides the subscriber with an access point, which can receive messages from terminals other than computers, specifically from telephones and facsimile machines. Thus, the personal mailbox number allows for receipt of voice and facsimile messages. With this arrangement, the subscriber may contacted by any personal computer (PC) user familiar with e-mail, as well as by any telephone or facsimile device. The various communications are received by a centralized system and are retrieved at the subscriber's convenience. When a communication is addressed to the subscriber using the e-mail address, the UAN may convert it to a facsimile transmission and send it out to the subscriber as a facsimile transmission. In this way, the subscriber need not have the capability of receiving all transmissions and can use certain features of the UANs for conversion of communications received in one form to another form. For example, facsimile transmissions may be converted to e-mail messages, or e-mail messages may be converted to speech. In this way, subscribers need not have their own conversion hardware and/or software.

Most so-called unified messaging services available today provide the subscriber with a telephone number that can accept voice mail, facsimiles, and/or e-mail messages. However, it is believed that these services cannot provide a real-time voice connection and, also, cannot integrate other telephone numbers and communication devices. Instead, these services give the user an additional number.

A Universal Identifier (UI) is a unique identifier for a particular person. Preferably, a UI is short enough to be memorable, yet long enough in order that all or most persons may have one or more UIs (e.g., for personal use, for business use) without duplication. One proposal for UIs is the use of a nickname (e.g., several words in length such as "Santa's Little Helper") along with an additional code called a checksum. Another proposal is a random combination of about eight letters and/or numbers, such as "A9B356JH".

Orenstein, D., "One Person, One Number," Business2.0, Mar. 6, 2001, discloses the concept of a Universal Identifier (UI) system in which one person wishes to find another. The first person types the second person's UI into an Internet-connected PC or wireless phone. The software on that device contacts a name server to match the UI to the second person's name. The name server then passes the request to another server that sorts through a database containing the second person's updated contact information and a privacy agent. The server then gives the first person the desired information. The Orenstein publication contemplates the use of UIs for e-mail messages, instant messages, mobile telephones, and postal systems.

It is known to employ RFID (i.e., radio frequency identification) devices, and infrared (scanning) devices that use wireless communication technology as a debit or credit card in transactions, such as financial transactions. For example, Mobil Oil Corporation employs Speedpass® RFID technology to directly charge a customer's conventional credit card account for the purchase of gasoline.

As another example, with E-ZPas[SM] electronic toll collection technology, account information on an electronic tag installed in a user's vehicle is read by a receiving antenna at a toll plaza. In turn, a toll is electronically deducted from the user's prepaid toll account.

It is known for retailers to employ customer loyalty cards as perks for frequent shoppers. For example, a consumer, who employs a customer loyalty card, may have special offers or points credited to his/her account with each purchase of goods or services from a retailer. With subsequent purchases at the retailer, the consumer receives special offers, discount coupons and/or other promotions depending upon the amount of points or money spent at the retailer under the particular customer loyalty card. Typically, such a consumer may carry a number of such customer loyalty cards, each of which corresponds to a different retailer.

It is also known for a retailer to issue to a consumer a store debit card (e.g., a store gift card) having a particular monetary value (e.g., $25, $50, $75, $100). In turn, the consumer may employ the store debit card in order to make purchases from the retailer. Also, these debit cards may be recharged (e.g., the original value can be restored; a different value may be restored).

It is known to provide a software product that enables organizations to centrally manage and administer authentication to multiple portals and applications. The software product consolidates disparate authentication technologies, including biometrics (e.g., fingerprint; voice; face; iris; signature recognition), tokens, smart cards and passwords, for access to multiple applications and networking resources. An example of such a product is the BioNetrix™ Authentication Suite 4.0, which is marketed by www.bionetrix.com.

There is room for improvement in methods and systems for rewarding users. There is also room for improvement in methods and systems for conducting financial transactions.

SUMMARY OF THE INVENTION

These needs and others are met by the present invention, which employs a unique identifier, such as a universal identifier, to conduct a transaction, such as a financial transaction corresponding to a good or service.

As one aspect of the invention, a method for conducting a financial transaction corresponding to a good or service comprises: providing a plurality of first credit or debit devices; associating a unique identifier with each of the first credit or debit devices; associating one of the first credit or debit devices with a plurality of second credit or debit cards; employing the one of the first credit or debit devices to initiate the financial transaction; selecting one of the second credit or debit cards based upon the unique identifier and the good or service; and employing the selected one of the second credit or debit cards to conclude the financial transaction.

The method may include employing a universal identifier as the unique identifier. The method may further include providing a reward related to the universal identifier in response to the financial transaction.

As another aspect of the invention, a system for conducting a financial transaction comprises: means for storing a plurality of codes associated with goods or services; means for storing a plurality of unique identifiers each of which is associated with one of a plurality of first credit or debit devices; means for associating one of the first credit or debit devices with a plurality of second credit or debit cards; means for initiating the financial transaction for one of the goods or services with one of the first credit or debit devices; means for selecting one of the second credit or debit cards based upon the unique identifier of the one of the first credit or debit devices and the code of the one of the goods or services; and means for concluding the financial transaction with the selected one of the second credit or debit cards.

As another aspect of the invention, a method for rewarding use of a universal identifier associated with a unique person comprises: initiating a transaction involving the universal identifier on a global communication network; identifying the unique person from the universal identifier of the transaction; and rewarding the unique person responsive to the transaction involving the universal identifier.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "person" means a natural person, firm, corporation, other business or non-profit entity, association, group or organization.

As employed herein, the term "universal identifier" means an identifier name, number and/or code for a person, which identifier uniquely identifies that person.

As employed herein, the term "financial transaction" shall expressly include, but not be limited, to any purchase or lease of any product, good or service.

As employed herein, the term "communication network" shall expressly include, but not be limited to, any local area network (LAN), wide area network (WAN), intranet, extranet, global communication network, wireless communication system or network, and the Internet.

As employed herein, the term "personal information" shall expressly include, but not be limited to, information pertaining to a person.

As employed herein, the term "kiosk" shall expressly include, but not be limited to, a terminal, display or client device employed to vend products, goods or services, and/or to initiate transactions (e.g., financial; credit or debit card; database; communication; delivery).

As employed herein, the term "HTML" shall expressly include, but not be limited, to HTML, dHTML (dynamic HTML), and other suitable technologies to produce a web page.

As employed herein, the terms "display" and "displaying" shall expressly include, but not be limited to, computer displays for displaying information, such as personal information, universal identifier (UID) related information, or reward information. It will be appreciated that such information may be stored, printed on hard copy, be computer modified, be combined with other data, or be transmitted for display elsewhere. All such processing shall be deemed to fall within the terms "display" or "displaying" as employed herein.

Figure 1:
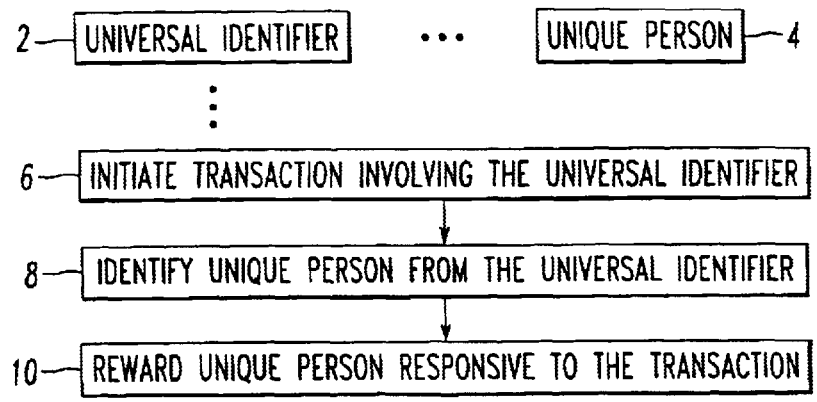
FIG. 1 is a flowchart and block diagram showing a method for rewarding use of a universal identifier associated with a unique person in accordance with an embodiment of the present invention.

Referring to FIG. 1, a method for rewarding use of a universal identifier 2 associated with a unique person 4 is shown. First, at 6, a transaction is initiated involving the universal identifier 2. Preferably, the transaction is initiated on a global communication network. Next, at 8, the unique person 4 is identified from the universal identifier 2. Finally, at 10, the unique person 4 is rewarded responsive to the transaction involving the universal identifier 2.

Figure 2:
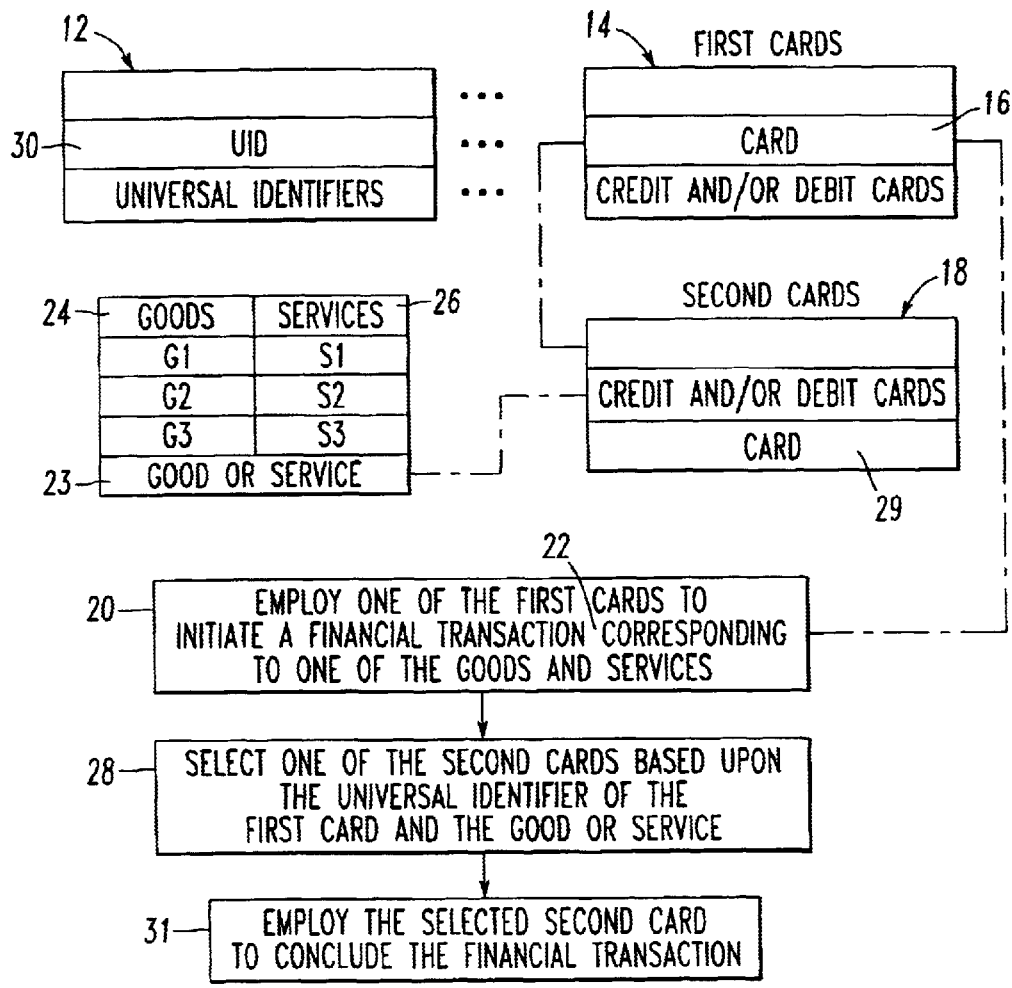
FIG. 2 is a flowchart and block diagram showing a method for conducting a financial transaction corresponding to a good or service in accordance with another embodiment of the present invention.

FIG. 2 shows a method for conducting a financial transaction corresponding to a good or service, such as 23. Each one of a plurality of unique identifiers, such as universal identifiers 12, is associated with a corresponding one of a plurality of first credit and/or debit devices, such as the exemplary credit or debit cards 14. In the exemplary embodiment, the exemplary first cards 14 selectively function as a credit card or a debit card, although the invention is applicable to first cards which function as only one of a credit card or a debit card. Each of the first cards 14, such as card 16, is associated with a plurality of second credit and/or debit devices, such as the exemplary credit or debit cards 18. In the exemplary embodiment, the exemplary second cards 18 function as only one of a credit card or a debit card, although the invention is applicable to such cards which function as both a credit card and a debit card. At 20, one of the first cards 14, such as card 16, is employed to initiate a financial transaction 22 corresponding to a good or service 23 of the goods 24 and services 26. Next, at 28, one of the second cards 18, such as card 29, is selected based upon the universal identifier (UID) 30 of the first card 16 and the good or service 23 of interest. Finally, at 31, the selected second card 29 is employed to conclude the financial transaction 22.

Figure 3:
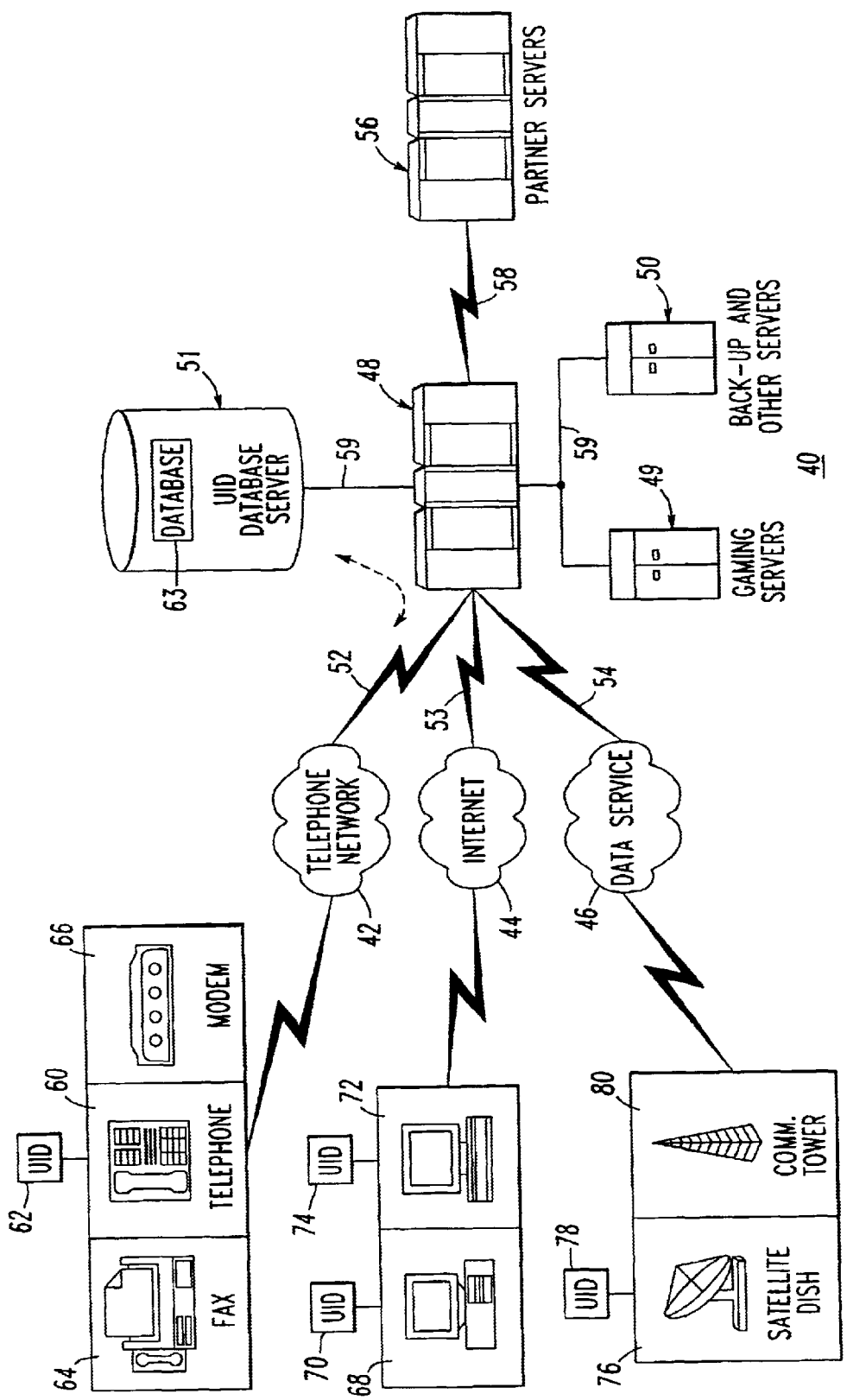
FIG. 3 is a block diagram of a computer system and various communication networks in accordance with the present invention.

FIG. 3 shows a computer system 40 and various communication networks, such as the exemplary telephone network 42; global communication network, such as the Internet 44; and data service network 46. The computer system 40 includes a plurality of main servers 48, gaming servers 49, backup servers 50, and a UID database server 51. Although multiple servers are shown, the invention is applicable to computer systems which have one or more processors. In the exemplary embodiment, the database server 51 provides a system database, which as a minimum, includes a plurality of UIDs (e.g., without limitation, unique 8 character names) associated with corresponding persons, such as members or subscribers. The system database may further include, without limitation, personal information about those persons.

The system servers 48 are interconnected to the telephone network 42, Internet 44 and data service network 46 by suitably high-speed communication connections 52, 53 and 54, respectively. A plurality of partner servers 56 are interconnected with the main servers 48 by a suitably high-speed communication connection 58. A suitable local area network (LAN) 59 interconnects the various servers 48,49,50,51.

The main servers 48 coordinate communications over the connections 52, 53, 54 and 58; access the UID database server 51 responsive to those communications; initiate gaming functions in the gaming servers 49; initiate backup of the UID database server 51 in the backup servers 50; and initiate additional services through the partner servers 56.

EXAMPLE 1

A user employs a telephone 60 to telephone the computer system 40 through the telephone network 42. During this communication transaction, the user enters (e.g., through the telephone keypad following a prompt from the computer system 40) a UID 62, which is uniquely associated with the desired recipient of the communication. The main servers 48 receive the UID 62, access the UID database server 51 to identify and obtain information regarding the desired recipient based upon the UID 62 in the system database 63, and store or forward the communication to the desired recipient based upon the database information. In turn, the main servers 48 initiate a gaming function in the gaming servers 49, in order to reward the identified desired recipient responsive to the communication transaction involving the UID 62.

Although a conventional telephone 60 is disclosed, the exemplary voice communication transaction may employ any suitable voice communication device (e.g., a wireless telephone, a cell phone, a mobile phone).

Alternatively, the user may employ a facsimile device 64 or a modem 66 to transmit facsimile or data information, respectively, to the computer system 40 through the telephone network 42. For example, the user inputs the UID in the device 64, which, in turn, connects with the main servers 48. A suitable server routine detects that the transmission is a facsimile transmission and delivers it to the member (e.g., to the member's facsimile machine, to the member's facsimile in-box at the web site of the computer system 40) per predefined delivery settings.

EXAMPLE 2

A user employs a personal computer (PC) 68 to access the system database 63 of the database server 51 through the Internet 44. During the database transaction, the user enters (e.g., through an entry field of a web page) a UID 70, which is uniquely associated with the database personal information of the person uniquely associated with that UID. The main servers 48 receive the UID 70, access the UID database server 51 to obtain the personal information based upon the UID 70 in the database, and forward the personal information to the user. In turn, the main servers 48 initiate a gaming function in the gaming servers 49, in order to reward the person uniquely associated with the UID 70 responsive to the database transaction involving that UID.

EXAMPLE 3

A user employs a workstation 72 to send an e-mail message to the computer system 40 through the Internet 44. During this communication transaction, the user enters (e.g., as part of the e-mail "address," for example, UID123@xyz.com) a UID 74, which is uniquely associated with the desired recipient of the e-mail communication. The main servers 48 receive the UID 74, access the UID database server 51 to identify the desired recipient based upon the UID 74 in the system database 63, and forward the communication to the desired recipient based upon the database information. In turn, the main servers 48 initiate a gaming function in the gaming servers 49, in order to reward the identified desired recipient responsive to the e-mail communication transaction involving the UID 74.

It will be appreciated that while reference has been made to the exemplary PC 68 and workstation 72, a wide range of other processors such as, for example, mainframe computers, mini-computers, microcomputers, and other microprocessor-based computers may be employed. For example, any suitable Internet-connected platform or device, such as a wireless Internet device, a personal digital assistant (PDA), a portable PC, or a protocol-enabled telephone may be employed.

EXAMPLE 4

A user employs a wireless device or a computer with a satellite dish to send a member's UID and data information to the computer system 40 through the satellite dish 76 and data service 46. The exemplary satellite dish 76 is an example of another communication channel for transmitting a member's UID and other information into the computer system 40, in order to process a transaction, such as a communication or financial transaction. During the exemplary communication transaction, the user enters a UID 78, which is uniquely associated with the desired recipient of the data information. The main servers 48 receive the UID 78, access the UID database server 51 to identify the desired recipient based upon the UID 78 in the system database 63, and forward the data information to the desired recipient based upon the database information. In turn, the main servers 48 initiate a gaming function in the gaming servers 49, in order to reward the identified desired recipient responsive to the communication transaction involving the UID 78. Alternatively, another suitable communication device, such as the communication tower 80, may be employed to transmit the data information.

EXAMPLE 5

There are many examples of services in accordance with the present invention. For example, in one embodiment, various computer systems are employed to track data associated with a plurality of UIDs. Multiple interface methods to that data are employed, including, but not limited to, smart cards, credit cards, magnetic IDs, traditional paper, computer interfaces, wireless devices, RFID, infrared devices, and the Internet. Preferably, strong encryption is applied to the data in order to ensure data integrity and security, thereby allowing only authorized users to gain access to the personal information in the system database 63 of the database server 51. Furthermore, connections to global information networks and the use of advanced backup devices ensure data integrity and real-time access to that personal information.

EXAMPLE 6

The exemplary computer system 40 may provide a unified messaging (e.g., voice mail, voice e-mail, e-mail, voice, facsimile) system. Most calls to the exemplary computer system 40 start from a traditional telephone, such as 60, of some sort. This may be, for example, a home or business phone, a mobile phone, or a facsimile. The telephone network 42 may include a Gateway IP (Internet Protocol) (not shown) where the call leaves the traditional telephone network and is converted into individual voice packets. Each network has its own protocol that allows devices on the network to communicate with each another. A Private IP Network (not shown) delivers the packets to their destination, in much the same way the Internet delivers e-mail to an in-box. There is one important difference, however. Most IP voice networks (not shown) are designed and managed for real-time transactions, since there are no delays or outright lapses in service as might be expected from the Internet.

A Gatekeeper IP (not shown) provides resource allocation, passes call control information (e.g., to make sure the number the user dialed is the number the user reaches), and collects billing records. The Gateway IP also hosts enhanced service applications (i.e., other than routing calls) on the network. A Network Interface (not shown) is provided for each network that is connected to the Gateway IP.

Subscribers may connect to the Gateway IP over the Internet 44. Using a web browser (not shown), the subscriber may receive real-time notification of incoming calls, initiate outgoing and conference calls, and manage the state of a call in progress.

Various steps are employed when a call is placed to a subscriber on the IP voice network with the call screening and notification features of the Gateway IP.

In the first step, a call is initiated by a user from, for example, a home telephone, a mobile telephone, or a facsimile. The call reaches the Gateway IP, which "packetizes" the call information (e.g., voice, facsimile, data). The Gateway IP also encodes voice data and identifies the data. Packets are labeled as voice, silence, background noise, DTMF tones, facsimile or modem. This allows other devices and applications to easily identify and read the information stream. For example, the Gateway IP knows when the end of a word occurs by noting the "silence" packets, thereby improving its voice recognition accuracy. The system can always easily determine when the user presses a button by watching for DTMF packets.

In the second step, the Gatekeeper IP is queried. The call is routed along the IP network, from a gateway (not shown) which is closest to where the user placed the call, to the centralized Gatekeeper IP. The Gatekeeper IP includes a database, which handles a variety of tasks including: logging on, transferring the call to the correct destination gateway, allocating resources, and providing billing information and other administrative functions.

For the third step, the Gatekeeper IP instructs the UID Gateway (not shown) by sending a message, via the IP network, to indicate that a new call has entered the network. The Gateway then identifies the subscriber who is being called by the caller (user) by analyzing the original number (the UID telephone number) that the caller dialed. Once the Gateway identifies that subscriber, it identifies the type of service it should be providing for the subscriber (e.g., voice messaging) and proceeds with processing the call.

In the fourth step, the Gateway notifies the subscriber. In this example, the Gateway provides call screening for the subscriber. A real-time notification of the incoming call is sent to the subscriber over the public Internet 44. A Java applet running in the subscriber's web browser (not shown) generates an HTML-based screen pop-up with a variety of options for the subscriber to handle the incoming call. If the subscriber is not logged into the system, or is simply not paying attention, then the Gateway automatically accepts voice mail (or performs some other pre-configured service) for the subscriber after a pre-configured timeout period.

Fifth, the subscriber accepts the call. Although there are a wide range of actions that the subscriber could have chosen to perform at this point, in this example, the user chooses to accept the call. By simply clicking on a link in a web page, the subscriber causes a message to be sent to the Gateway over the public Internet 44, instructing it to accept the call at the subscriber's current location.

Next, in the sixth step, the Gateway queries the Gatekeeper IP for the address of a gateway (not shown) which is closest to the subscriber's current location (e.g., the location as specified by the subscriber after logging into the Gateway). The Gateway then sends a message, via the IP network, to the Gatekeeper IP along with instructions to transfer the waiting call to the destination gateway.

For the seventh step, the Gatekeeper IP sends a message, via the IP network, to the destination gateway along with instructions that the user is making a call to a nearby phone number. At this point, the system knows where the call came from and where it is going. The call is encoded and transferred on the IP network, and the system maintains suitable billing information.

Next, at step eight, the callers are connected, via the Gateway and the IP voice network. The Gateway continues to monitor the call for its duration. At any point, the Gateway can take control of the call back to perform additional services (e.g., whisper call waiting, conferencing).

The present system 40 provides a real-time voice contact like a conventional telephone number, but also gives the member the power to control all of his/her other telephone numbers and communication tools. Users of the exemplary computer system 40 need not give out telephone numbers, miss important calls, or receive unwanted calls. Members may view facsimiles on their computer screen rather than looking for them on their desk. Members may receive telephone calls to their New York office, even while they are in Tokyo. The system 40 provides an integrated, comprehensive suite of enhanced communication services, including: (1) one UID for the subscriber: the member may program the system to forward his/her calls to up to a plurality (e.g., five or more) of other telephone numbers, such as office, cellular, car, beach house or anywhere else the member wishes to be reached; (2) one communication portal for the subscriber: the member may access all of his/her communication functions from the Internet 44, in order to listen to messages, view facsimiles, and place calls online.

In response to the communication transaction, the main servers 48 initiate a gaming function in the gaming servers 49, in order to reward the subscriber responsive to the communication transaction involving the UID.

EXAMPLE 7

The Gateway IP (not shown) may employ relatively more complex transactions, such as routing calls to different phones, receiving and broadcasting facsimiles, forwarding voice mail and facsimiles as e-mail, paging notification, web-based e-mail, and web-based call control, and other functions. All of these are possible because the information (i.e., the call) is encoded as identifiable packets and carried on an IP network. In turn, suitable applications on top of the Gateway IP manipulate, move, and store that information.

A suitable IP network provider (not shown) provides an IP voice network infrastructure. As a result, the system may have access to, for example, 50 points of presence (POPs) (e.g., where the actual telephone lines are terminated; such as by making a local telephone call, after which the call is routed to the closest Gateway IP in the network) located in major cities throughout the United States, thereby letting service providers deliver their services to over 70% of the continental United States via a local phone call. Furthermore, an 800 number service may be provided for the rest of the United States (and Canada).

For example, a Voice Application Server (VAS) (not shown) may be at the core of the Gateway IP. The VAS is a telephony equivalent of a web server combined with a browser. Service providers develop new "Voice Applications" using VoiceXML, an industry standard scripting language based upon XML. Those providers then register their Voice Application with the VAS and map it to a range of incoming UIDs. The VAS then uses a "Voice Browser" to render the application to callers anytime a call is received within the application's UID range.

By employing the VoiceXML scripting language as a basis for application development, there are several advantages. First, relatively simple applications are rendered statically from a file, while more complex applications may be interpreted dynamically from a web server. By taking advantage of the backend processing power of a web server, service providers can rapidly develop relatively complex voice applications. Furthermore, an application featuring a telephone-based VoiceXML interface and an Internet-based HTML interface may share the same backend processing logic of a web server, thereby reducing the work required to maintain business rules for the two different interfaces. Since VoiceXML is a standard, service providers' applications are portable across technologies and platforms. Applications may be linked together, thereby allowing the creation of a relatively large and sophisticated application from a collection of smaller and simpler component applications.

Preferably, the VAS implementation is modeled after Microsoft's Internet Information Server (IIS) and is tightly integrated with the internal subscriber database of the UID Gateway (not shown).

Applications can be hosted remotely in the exemplary partner servers 56 as well as locally in the main servers 48, thereby giving service providers the ability to add voice functionality to an existing web service without having to maintain any hardware locally.

A Gateway (not shown) associates UIDs with a generic service (e.g., a sports line service) at a suitable web site. Application access may be provided at both the subscriber and the site levels. Hence, application access can be throttled based upon port utilization. This allows the maximum number of callers, which may simultaneously access an application, to be controlled.

Preferably, system access is audited at the application level. This permits a caller to access plural applications during a single call, with each application being billed for the period of time that it was connected to the caller.

In response to the communication transaction, the main servers 48 initiate a gaming function in the gaming servers 49, in order to reward the subscriber responsive to the communication transaction involving the UID.

EXAMPLE 8

The exemplary telephone network 42 may route a subscriber's incoming calls and facsimiles to one or more telephone numbers that the subscriber specifies in the system database 63 of the database server 51. All callers to the computer system 40 are prompted to either connect to the subscriber or to leave a voice message. Callers are also prompted to announce themselves in order that the subscriber may decide whether to accept the call or send it to voice mail. The computer system 40 determines if an incoming call is a facsimile and accepts the facsimile for the subscriber. The subscriber, in turn, can check voice messages and facsimiles at a personal communication portal through the Internet 44. The subscriber can also check voice messages over the telephone network 42.

The subscriber need not change any of his/her existing telephone numbers because the computer system 40 sends incoming calls to those numbers based upon information from the database server 51. The subscriber receives one new UID from the vendor of the computer system 40. That UID is the only "number" that the subscriber needs to give out for home, office, cellular, and facsimile communications. If the subscriber changes one or more telephone numbers because of a move or a change in service providers, the UID remains the same. This is the last "number" the subscriber will ever need because it can follow the subscriber wherever he/she goes.

In this example, every subscriber has one unique UID for contact information. Contacting a subscriber is as simple as entering that person's UID into any connected Internet, communication, or wireless device. Whenever a subscriber moves, or changes jobs or e-mail addresses, all he/she has to do is update the system database with the new contact information. The subscriber's portion of the system database is populated by the subscriber and contains information that only the subscriber desires to be displayed.

The system database 63 may also contain a complete and secured demographic profile of the subscriber. The subscriber can choose what information others can access by secured levels and codes. If a user wants to find another subscriber, the user simply types in the person's UID into the communication, Internet-connected, or wireless device. The software on that device contacts one of the main servers 48 to match the UID to the name. The main server 48 then passes the request to the database server 51, which accesses the system database 63 with the UID in order to obtain the personal information of the subscriber who is associated with that UID. In turn, some or all of that information is returned to the user or is employed to connect the user to that person. In this manner, there is no need to contact the subscriber at a work, home, car, facsimile, or cell phone number. The local UID is input and the computer system 40 accesses the UID database to find the actual number, which rings wherever the subscriber is located.

In response to the communication or database transaction, the main servers 48 initiate a gaming function in the gaming servers 49, in order to reward the subscriber responsive to the communication or database transaction involving the UID.

EXAMPLE 9

Although various rewards are disclosed herein, the invention is applicable to any suitable reward in association with use of a UID. For example, some of the possible rewards include: a random instant win (e.g., as disclosed by U.S. Pat. No. 5,791,991), a game play, a sweepstakes drawing, a points reward, a monetary prize, a good, or a service.

One or more rewards programs may be offered to encourage fees from subscribers and to stimulate usage of the services of the computer system 40. Selected advertisers may also participate by paying sponsorship fees or providing prizes and/or merchandise in support of the program. For example, instant win random technology may be delivered to the subscriber's Internet device, sweepstakes drawings may be provided, and/or a loyalty rewards program may provide points redeemable for merchandise. As another example, the instant win game play may be in the form of a spin & win, or other random play, that would be activated by the subscriber via a click and play game. Further examples of games are disclosed in U.S. Pat. No. 5,007,641, which is incorporated by reference herein.

Concurrently with the access to the system database 63, the main servers 48 initiate a reward to the subscriber through the gaming servers 49. The gaming servers 49 set a random number generator to produce stored information on demand in an apparently random manner. The main servers 48, which are connected between the random number generator and the subscriber's display, produce an apparently randomly selected character or image display that immediately informs the subscriber of an instant win, or rewards points notification on an Internet-connected, or wireless device. Alternatively, the subscriber may check their e-mail, or a web site in-box, in order to determine if they have won a prize. If the user wins a prize, then the computer system 40 automatically sends the prize to them. If the subscriber receives point rewards, then the main servers 48 store the points and the subscriber can redeem the points for merchandise, travel discounts and other such rewards. Alternatively, the subscriber may be entered into a sweepstakes drawing.

In another embodiment, the subscriber may access a game play at the subscriber's in-box at the vendor's web site. The subscriber logs onto their account and finds a message associated with the game. The subscriber clicks on an encrypted URL contained within the message, which launches the game play in the web browser.

When the promotion date and time have expired, the corresponding gaming program automatically shuts down and reports its "shut down" to the vendor of the computer system 40 of FIG. 3. Preferably, all program data is archived and copied from the system by the servers 50.

EXAMPLE 10

Figure 4:
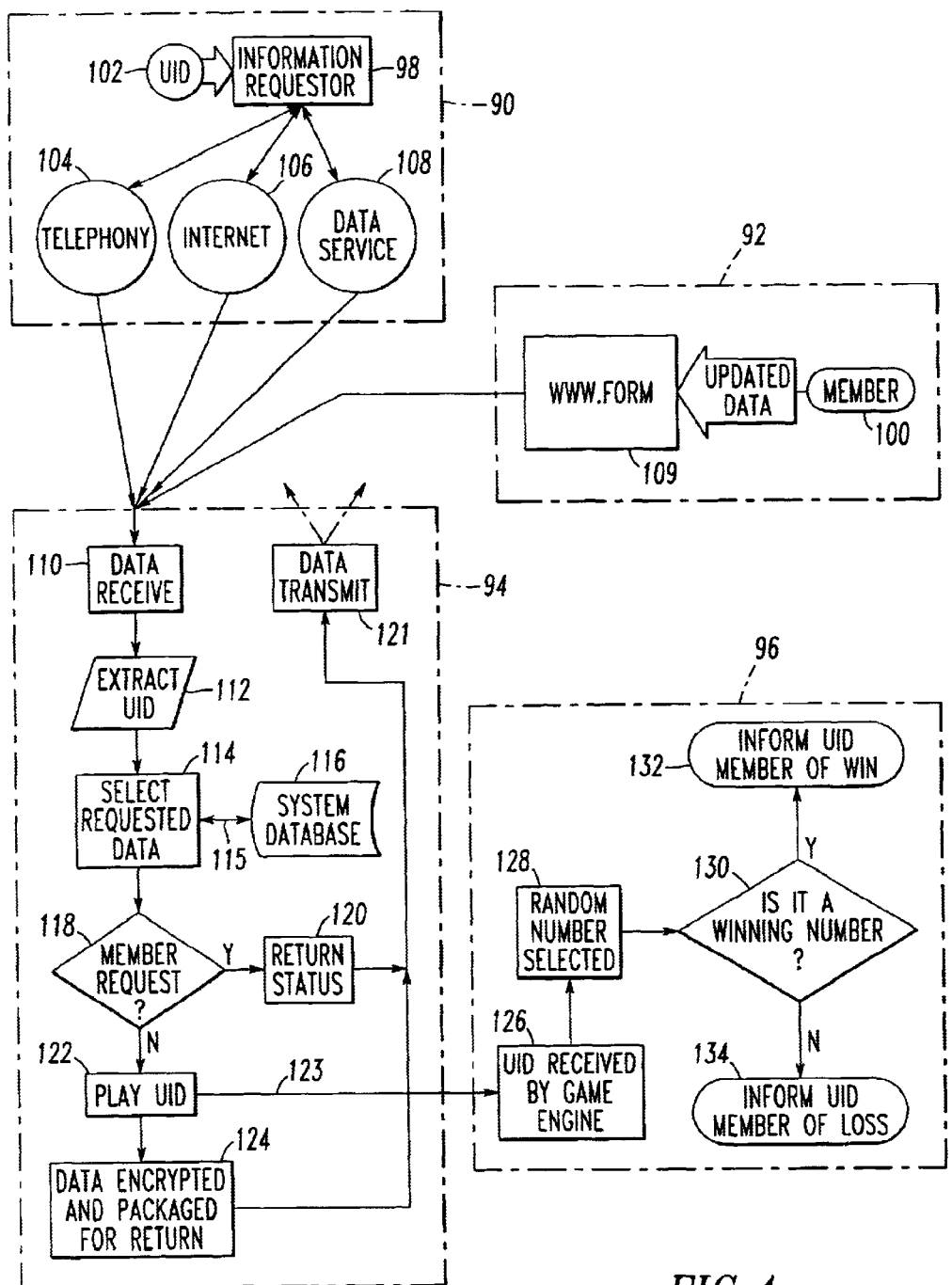
FIG. 4 is a flowchart and block diagram showing various communication services employed with the system of FIG. 3.

Referring to FIG. 4, various communication services are employed by: (1) a user, such as a person 98; and (2) a subscriber or member 100 of the computer system 40 of FIG. 3. FIG. 4 includes portions 90, 92, 94 and 96, which are employed by the information requestor 98, the subscriber or member 100, the main servers 48 and the gaming servers 49, respectively. Portion 90 represents the process of requesting information by the user. For example, when the member 100 provides his/her UID 102 to another person, such as the information requester 98, that user may request and receive personal information associated with the UID 102 of that member 100 through various access methods, such as, for example, telephony 104, the Internet 106, or a data service 108.

Portion 92 represents the process of updating personal information by the member 100. For example, the member 100 may employ one of various access methods (e.g., telephony, the Internet, a data service, a paper form) to update (e.g., add, modify, delete) the personal information associated with the UID 102 and/or to set (or reset) controls on which persons may access that personal information. In the exemplary embodiment, a form 109 on the web site of the computer system 40 of FIG. 3 is employed to update the personal information and/or adjust the access controls. For example, the personal information may include a residence address and a business address of the member 100. That member might choose to restrict access (e.g., based upon the requester's name, telephone number, e-mail address) to, for example, the member's residence address by a predefined group of family members and friends.

Portion 94 represents the flowchart of the main servers 48 of FIG. 3. First, at 110, the UID information request data is received. Next, the UID 102 is extracted from the information request data, at 112, and the requested personal data is selected at 114. A request, at 115, is sent to the database server 51 of FIG. 3, which server accesses the system database 116 to obtain (or update) the requested personal information of the member 100. Next, at 118, it is determined whether the information request data was received from a member, such as 100, or an information requester, such as 98. If the member 100 sent the information request data, then a status of the database update is obtained, at 120. Next, at 121, the database update status is returned to the member 100.

On the other hand, if the information request data was received from the information requester 98, then, at 122, a reward is initiated based upon the UID 102. In this example, the unique UID 102 is sent, at 123, to the gaming servers 49, which employ that UID to create a game play and, then, return the results to the member 100. Next, at 124, the requested personal information is suitably formatted and, preferably, is encrypted. In turn, at 121, that formatted and encrypted information is returned to the information requester 98 through the corresponding one of the access and return methods 104,106,108.

Portion 96 represents the flowchart of the gaming servers 49 of FIG. 3. At 126, the UID 102 is received by a suitable game engine. Next, at 128, a random number is selected by a suitable random number generator. Then, at 130, it is determined whether the random number is a winning number (e.g., by comparing the random number to a predetermined list of winning numbers). If so, then, at 132, the UID member 100 is informed (e.g., through an e-mail message) of the win. Otherwise, if there was no win, then, at 134, the UID member 100 is similarly informed of a loss.

EXAMPLE 11

Figure 5:
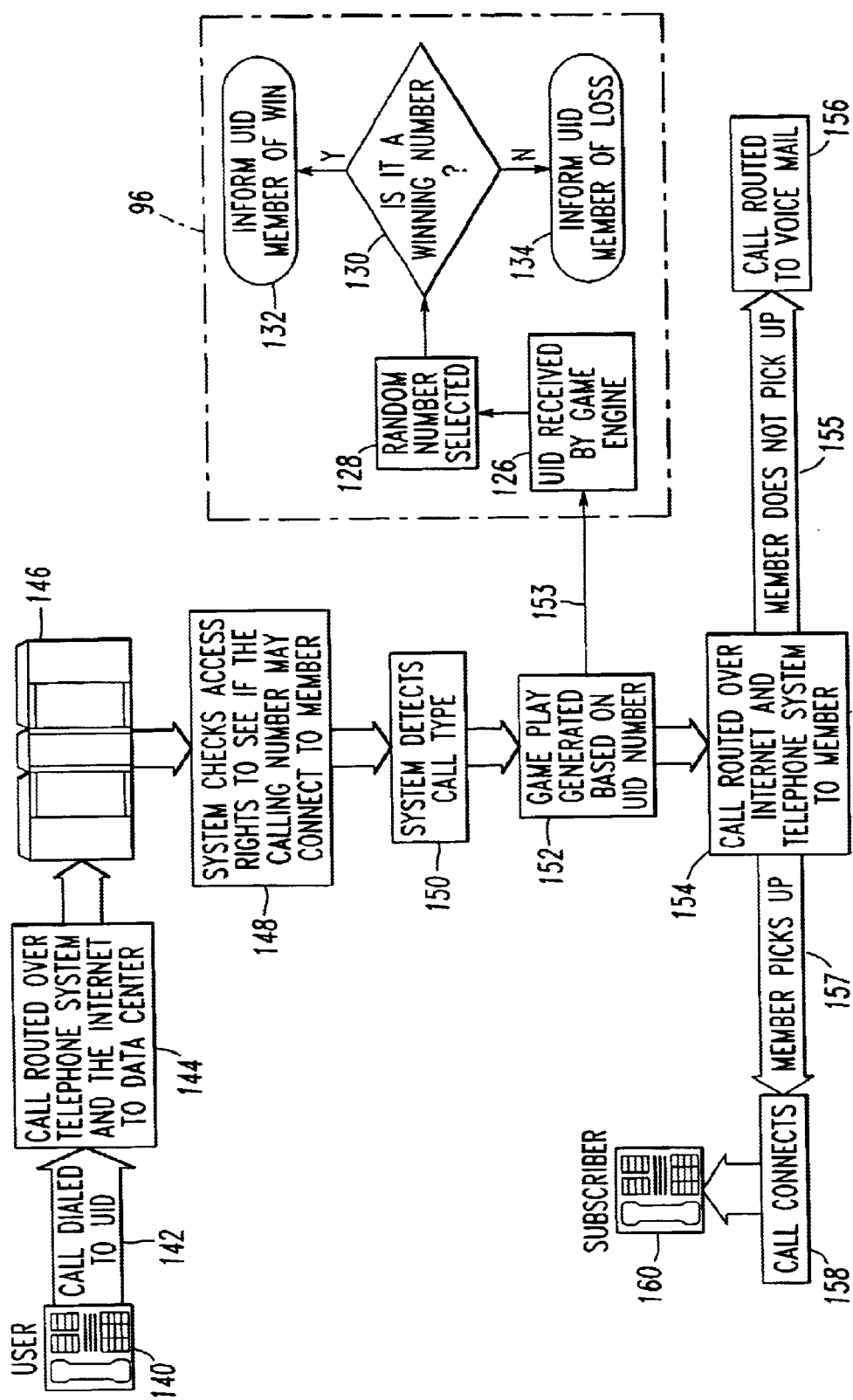
FIG. 5 is a flowchart and block diagram showing a telephone communication service employed with the system of FIG. 3.

FIG. 5 shows a flowchart and block diagram for a communication transaction, such as a telephone call, which is serviced by a unified messaging service. Although the exemplary embodiment shows a voice communication between two telephones 140,160, the invention is applicable to a wide range of communication types (e.g., call forwarding, conferencing, facsimile, e-mail, data) between a wide range of sources and destinations (e.g., a subscriber's location at home, business, travel, vacation).

In this example, a unique UID, which is assigned to the subscriber, corresponds to the format of a conventional telephone number (e.g., (123) 456-7890; a global telephone number, such as a 15 digit number). Alternatively, the invention is applicable to a system in which the user dials a central telephone number (e.g., 1 (900) 123-4567; 1 (800) 123-4567) and is prompted to enter (e.g., by keypad, by voice recognition) the unique UID, which is assigned to the subscriber. First, at 142, the telephone call is dialed to the unique UID. Next, at 144, the call is routed (e.g., over the telephone system and the Internet) to a data center 146, such as the computer system 40 of FIG. 3. At 148, the computer system 40 checks the calling number (e.g., by employing conventional caller ID) to determine if the user has access rights to connect to the member. For example, based upon information in the system database 63 of FIG. 3, calls that would normally be directed to the member's residence number might be restricted based upon a predefined list of calling numbers of family members and friends. If access is denied (not shown), then the caller might be disconnected, the call might be directed to the member's standard voice mail, or the call might be directed to member's secondary (e.g., for "junk" calls) voice mail.

Next, at 150, the system detects the call type (e.g., telephone, facsimile, data) and, at 152, a reward is initiated based upon the UID number. In this example, the unique UID number is sent, at 153, to the gaming servers 49. As discussed above in connection with FIG. 4, those servers employ that UID number to create a game play and, then, return the results to the member.

At 154, the call is routed (e.g., over the telephone system and the Internet) to the member. For example, the member may update the personal information associated with the UID number to direct (or redirect) telephone calls from business associates to the member's hotel telephone number. At 155, if the member does not answer the call, then, at 156, the call is routed to a predefined number (e.g., the member's secretary's telephone number) or location (e.g., the member's voice mail). Otherwise, at 157, if the member does answer the call, then the call is connected, at 158, to the member's predefined telephone 160.

For example, prior to steps 155 and 157, each incoming caller is preferably announced before the member accepts the call. In this manner, the member always knows the caller's identity, in order to decide which calls to take and which calls to send to voice mail. The identity of incoming caller is preferably "whispered" to the member, in order that the caller does not hear. The member, then, either accepts the call or sends it to voice mail. Alternatively, the member's account may be programmed to reach an assistant, co-worker or reception desk if the user is unable to receive calls. Furthermore, if the member does not want to receive work-related calls during non-working hours, then the member may program the system to stop sending those calls at the end of the business day. Those calls will be sent directly to voice mail. As another option, the member may set a pass code in order to allow selected people, who are provided with the pass code, to be able to reach the member.

Although the exemplary embodiment shows telephone voice communications, the invention is applicable to all forms of communication, including voice, data, voice mail, facsimile, e-mail, messaging, smart call routing, large scale conferencing, voice dialing by name, call screening, and other forms of outbound calling.

EXAMPLE 12

Users may call the UID telephone number to leave the subscriber a traditional voice mail message. Similarly, any user may send an e-mail message to the subscriber's UID e-mail address (e.g., UID789@xyz.com). Users may also send a facsimile to the subscriber by employing the UID telephone number.

On the Internet, the subscriber may go to the system web site, and login using a user name (e.g., the UID) and password (e.g. a personal identification number (PIN)). Once the subscriber is in the UID in-box, the subscriber may hear voice mail, read e-mail, and view facsimiles.

On the telephone, the subscriber may call the central UID telephone number, and press "*" after hearing a greeting in order to access the mailbox. In order to protect privacy, the subscriber is prompted to enter a telephone PIN. Next, the subscriber hears a message status, which tells how many new messages of each type the subscriber has received. Then, the subscriber user may have the option to listen to the voice mail.

Preferably, the system converts voice messages into streaming audio that the user can hear over his/her computer's speakers with one mouse click. The user may view a list of messages, then check, delete, store and forward messages in any order the user desires. The member may receive a telephone or pager notification whenever a new message has arrived at the system.

EXAMPLE 13

The member's UID also provides easy access to products and services that employ electronic forms. Subscribers enter their UID into an entry field (not shown) provided on any suitable web site and click a "Submit" button. The UID is submitted to the main servers 48 of FIG. 3 and the subscriber's personal information is provided from the database server 51. The subscriber may control what personal information they want to provide in a safe, private and secured environment, thereby eliminating concerns regarding privacy issues. Furthermore, each time a subscriber uses their UID, the system may provide prizes or rewards points redeemable for merchandise, travel discounts and other such rewards.

Exemplary services include: (1) an online interface for all voice, data, facsimile and messaging; (2) smart call routing; (3) an integrated calendar and address book which synch with a PDA (e.g., Palm, Outlook); (4) personalized news content; (5) point and click web-based calling (with conference capability); (6) instant win random technology delivered to the user's device; (7) sweepstakes drawings; (8) loyalty rewards program redeemable for merchandise; (9) prize and merchandise procurement; and (10) providing partner companies with a unique way to reach subscribers, such as mobile professionals, through a variety of programs and sponsorship opportunities.

EXAMPLE 14

Figure 6:
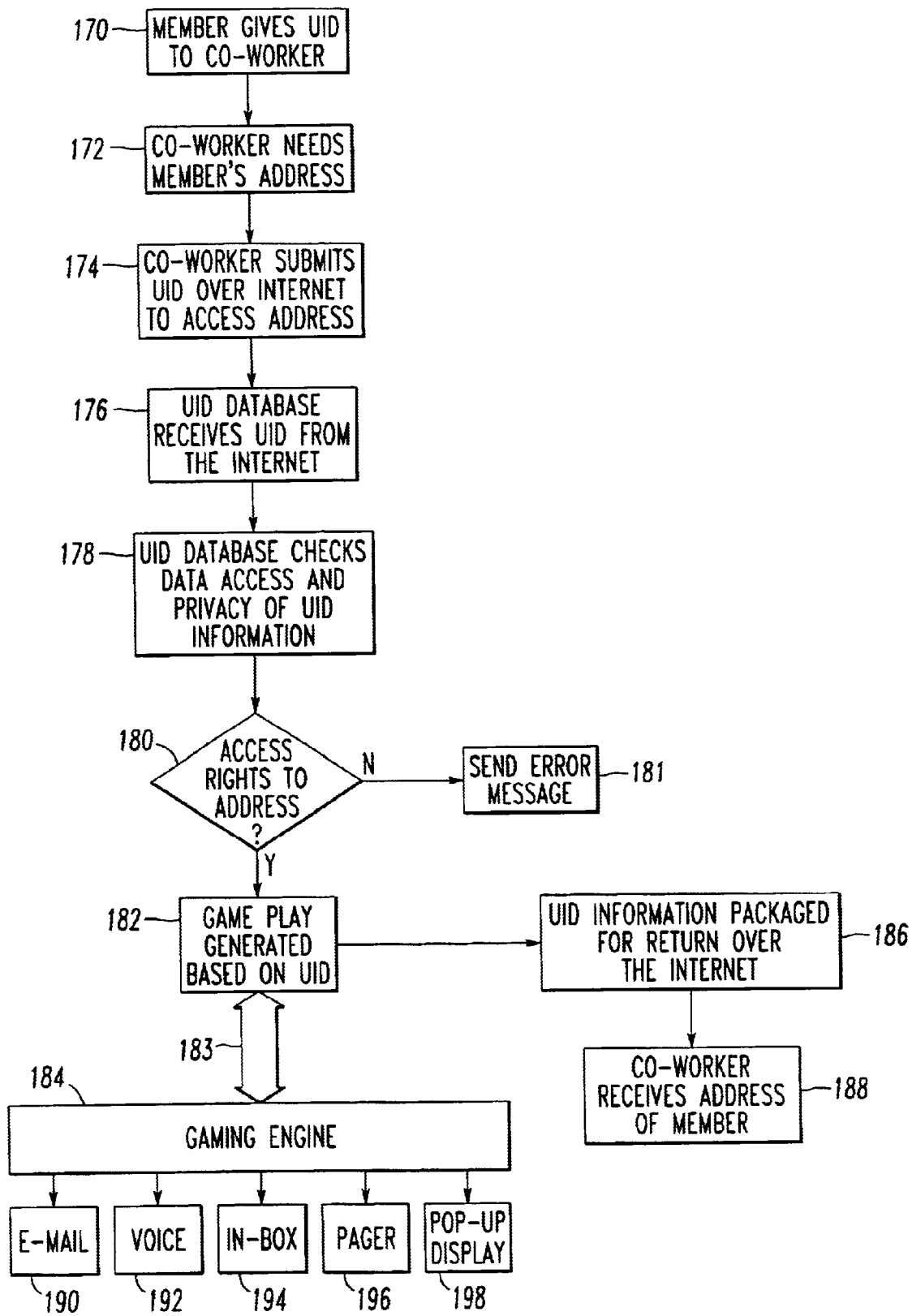
FIG. 6 is a flowchart and block diagram showing a database access service employed with the system of FIG. 3.

FIG. 6 shows a database transaction as employed with the computer system 40 of FIG. 3. First, at 170, a member gives his/her UID to a person, such as a co-worker. Subsequently, at 172, the co-worker has the need for the member's address (e.g., residence address, business travel address, vacation address). Then, at 174, the co-worker submits (e.g., through the web site of the computer system 40 over the Internet; through an electronic kiosk at a shopping mall, which provides a menu of possible inquiry selections) the UID, a request for the member's personal information (e.g., the member's home address), and security information (e.g., the co-worker's name, the co-worker's e-mail address, a security code). Next, at 176, the database server 51 (through the main servers 48) receives the UID and the request for the member's personal information.

At 178, the database server 51 checks the data access and privacy of the requested personal information based upon the security information and corresponding access information in the system database 63. For example, only certain co-workers may have access rights to the member's home address based upon a predefined list of names, e-mail addresses and/or security codes. At 180, if the access rights to the requested personal information are not available, then, at 181, an error message is sent to the co-worker. Otherwise, at 182, a reward (e.g., a game play) is initiated based upon the UID. In this example, the unique UID is sent, at 183, to a gaming engine 184, which employs that UID to create a game play and, then, to return the results of that game to the member.

Next, at 186, the requested personal information (e.g., the member's home address) is suitably formatted and encrypted for return to the co-worker who receives, at 188, the exemplary home address.

As discussed above in connection with FIG. 4, the member is informed (e.g., by e-mail) of a win or loss based upon the game play. In the exemplary embodiment, the gaming engine 184 includes a plurality of communication paths for communicating the reward (e.g., a game play win) to the identified unique person. Preferably, the member may predefine one or more paths for communication of a win, and one or more paths for communication of a loss. Although exemplary communication paths including electronic mail 190, voice communication 192, web site in-box 194, pager 196, and web site pop-up display 198 are shown, the invention is applicable to a wide range of other known communication paths. For example, the member may predefine the electronic mail 190 and/or voice communication 192 paths in the event of a win, with a less intrusive path, such as a web site in-box 194, being selected in the event of a loss.

EXAMPLE 15

The invention may alternatively employ unique ID Cards, UIDs or UID numbers for any database inquiry application in which unique piece(s) of data about a person are linked to a unique UID. The UID may be associated with any piece of personal information, including, but not limited to, one or more of telephone numbers, addresses, other communication addresses (e.g., for conventional or electronic mail at home, business, travel, vacation, forwarding), door access codes, financial accounts, credit/debit card numbers, and healthcare information. Entities, such as companies, and individual persons can electronically access any of the personal information associated with the unique UID. The use of a single UID to be linked to personal information allows that information to be updated centrally and simply referenced by an unchanging UID.

Since the system database associates a plurality of UIDs with a plurality of corresponding unique persons and their personal information, the system database 63 of FIG. 3 may be accessed to both identify the unique person based upon the UID of the database transaction, as well as to access one piece, some, or all of the corresponding personal information, subject to any access and privacy constraints that the member or subscriber might define. For example, access to the member's resume might be limited to a very select group of business entities, while unrestricted access to the member's current delivery address (e.g., for home, business, travel, vacation, forwarding) might be provided to selected couriers (e.g., Federal Express, United States Postal Service Express Mail), friends and business associates.

EXAMPLE 16

The subscriber's unique UID may also provide easy access to products and services that employ electronic forms. Subscribers enter their UID into an entry field provided on a web site display screen and click a "Submit" button. In turn, the UID is sent to the main servers 48 of FIG. 3, which suitably retrieve and provide the subscriber's personal information from the database server 51. The subscriber may control what information they want to provide in a safe, private and secured environment, thereby eliminating concerns regarding privacy issues. Furthermore, each time a subscriber's UID is employed by a user, the subscriber may win prizes or valuable rewards points redeemable for merchandise, travel discounts and other such rewards.

EXAMPLE 17

Figure 7:
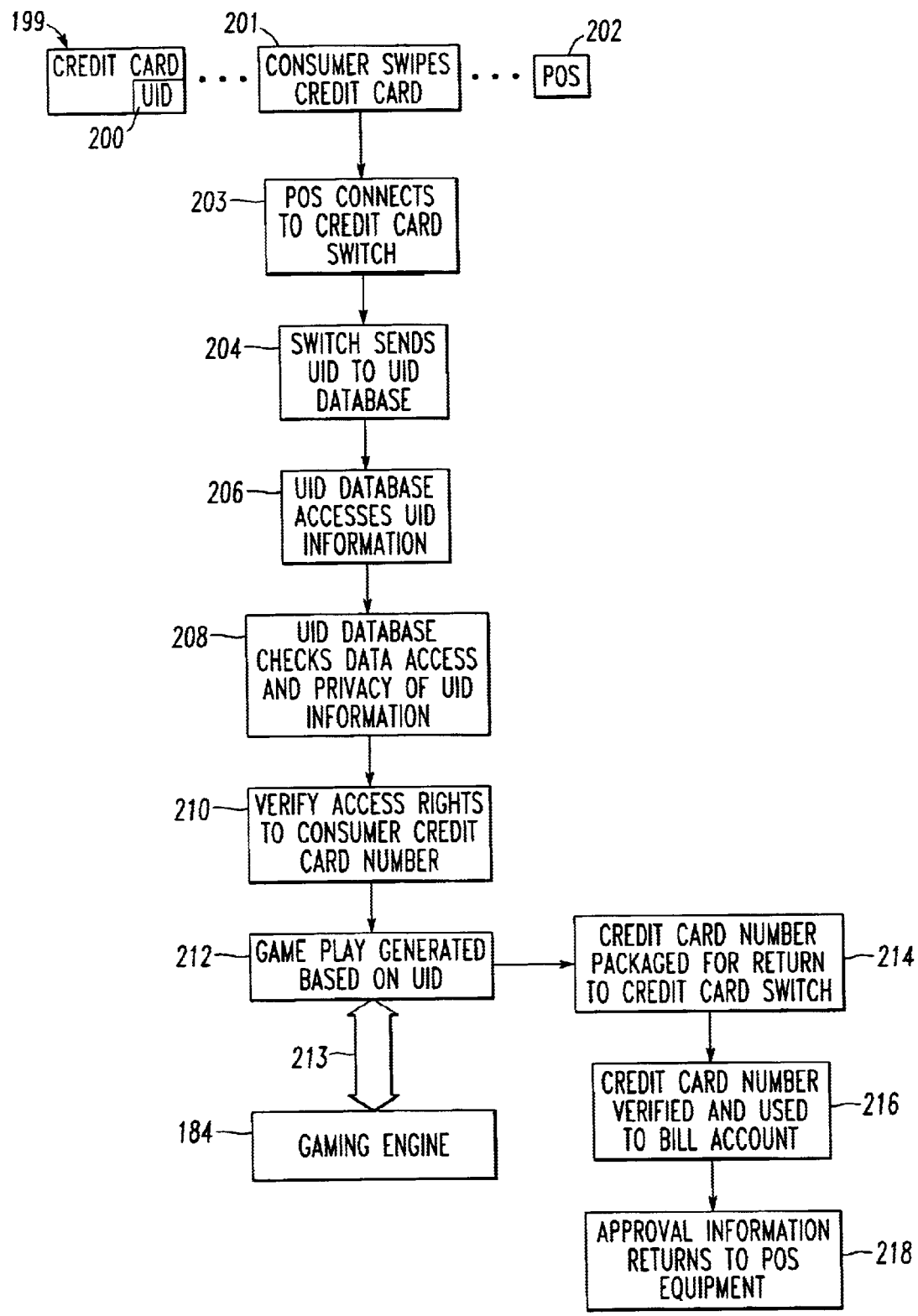
FIG. 7 is a flowchart and block diagram showing a credit card transaction in accordance with the present invention.

FIG. 7 shows a financial transaction, such as a credit card transaction, in which a single credit card 199 is uniquely associated with a particular UID 200. Although an exemplary credit card 199 is shown, the invention is applicable to debit cards and/or other cards, which selectively function as a credit or debit card. At 201, a consumer presents and swipes the credit card 199 at a conventional point of sale (POS) terminal 202. In the exemplary embodiment, the POS terminal 202 is located at a retail establishment (i.e., brick & mortar vendor) for the sale of goods. Although the exemplary transaction involves the sale and purchase of goods, the invention is applicable to the sale and purchase of services, or the leasing of goods and/or services, as part of any financial transaction (e.g., retail, wholesale, e-commerce, business-to-business, commercial, governmental).

At 203, the POS terminal 202 connects to a credit card switch, which switches the request to a credit card processing center, or which functions as a credit card processing center. Next, at 204, the switch sends the UID 200 to the main servers 48 of FIG. 3. At 206, the database server 51 accesses the UID information from the system database 63, including a credit card name, credit card number, the issuing bank (e.g., the bank number and unique bank identifier), and the expiration date of the member's conventional credit card. Next, at 208, the database server 51 checks data access and privacy of the UID information. For example, in the event of the loss or theft of the credit card 199, the user may update the access rights to restrict all access to the conventional credit card information, thereby readily precluding improper use of the card 199 by a finder or thief. Then, at 210, the main servers 48 verify the access rights to the member's conventional credit card. In the event of restricted access rights, a conventional denial of transaction message (not shown) is returned to the switch and POS terminal 202. Next, at 212, the unique UID is sent, at 213, to the gaming engine 184, which employs that UID to create a game play and, then, return the results to the member. Hence, the gaming engine 184 provides a reward to the member related to the UID and in response to the credit card transaction.

At 214, the main servers 48 send the credit card name, credit card number, expiration date, bank number and unique bank identifier of the member's conventional credit card to the switch for verification. At 216, as is well known, the switch verifies the conventional credit card information, compares the purchase amount with the available credit line, and, absent any irregularity, bills the member's conventional credit card account. Finally, at 218, the switch sends the approval information to the POS terminal 202.

EXAMPLE 18

Although the foregoing example show a UID credit card 199 being swiped at a POS terminal 202, the invention is applicable to a wide range of credit and/or debit card transactions in which the UID credit card information, including the UID, is input as part of an electronic commerce transaction (e.g., as part of a purchase or lease of a product or service through, for example, a communication network, such as a global communication network or wireless communication network, from a web page by a PC, wireless communication device, or protocol enabled telephone).

EXAMPLE 19

Although the foregoing two examples show a reward being provided to the member through the exemplary game play steps 212,213,184, the invention is applicable to UID credit and/or debit card financial transactions which provide other reward(s) related to the member's UID in response to such financial transactions.

EXAMPLE 20

Figure 8:
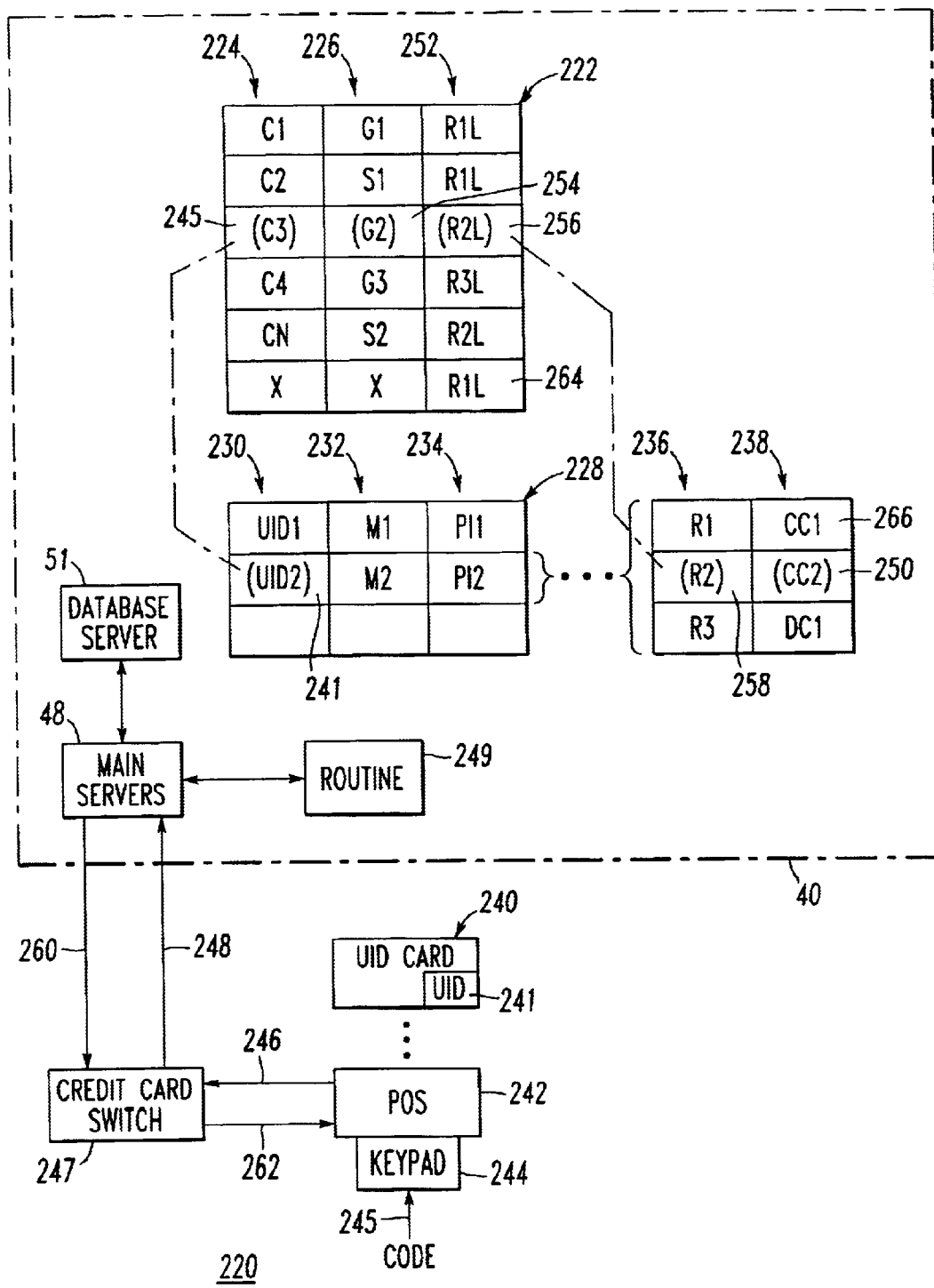
FIG. 8 is a block diagram showing a credit card transaction system in accordance with another embodiment of the present invention.

FIG. 8 shows a system 220 for conducting a credit card transaction. The database server 51 of FIG. 3 includes a first database storage area 222 for storing a plurality of codes (C1,C2,C3,C4,CN) 224 associated with respective goods or services (G1,S1,G2,G3,S2) 226, and a second database storage area 228 for storing a plurality of unique UIDs (UID1,UID2) 230 each of which is associated with a corresponding member (M1,M2) 232 and personal information (PI1,PI2) 234 of that member. The member's personal information 234 includes, as shown for member M2, representations (R1,R2,R3) 236 (e.g., the name of the credit or debit card, the card number, the expiration date, bank number and unique bank identifier of the card) of a plurality of conventional credit and debit cards (CC1,CC2,DC1) 238.

Whenever the member initiates a financial transaction for a good or service with the member's UID credit/debit card 240 having a UID 241, the member swipes that card at a POS terminal 242 and, also, enters (e.g., on a keypad 244 of the POS terminal) a code 245 corresponding to the good or service of interest. The POS terminal 242 communicates, at 246, with a switch (credit card processing center) 247, which, in turn, communicates, at 248, to send the UID 241 and the code 245 to the main servers 48 of FIG. 3. A server routine 249 selects a credit or debit card, such as credit card (CC2) 250 from the member's (e.g., M2's) conventional credit or debit cards 238 based upon the member's UID (e.g., UID2) 241, the code (e.g., C3) 245 of the good or service (e.g., G2) 254, and the first database storage area 222. That storage area 222 also includes links (R1L,R2L,R3L) 252 to the representations (R1,R2,R3) 236. In this example, the code (C3) 245 for the good (G2) 254 is associated by the link (R2L) 256 with the representation (R2) 258 of the conventional credit card (CC2) 250.

In turn, in a similar manner as discussed above in connection with FIG. 7, the database server 51 accesses the UID information from the system database 63, namely the representation (R2) 258 of the credit card (CC2) 250, including the credit card name, credit card number, expiration date, bank number and unique bank identifier of that conventional credit card 250. The database server 51 also checks data access and privacy of the UID information as discussed above in connection with FIG. 7.

The main servers 48 communicate, at 260, the credit card name, credit card number, expiration date, bank number and unique bank identifier of the member's conventional credit card 250 to the switch 247 for verification. In turn, the switch 247 verifies the conventional credit card information, compares the purchase amount with the available credit line, and, absent any irregularity, bills the member's conventional credit card account. Finally, the switch 247 communicates, at 262, the approval information to the POS terminal 242, which concludes the financial transaction.

EXAMPLE 21

As an alternative to the foregoing example, the POS equipment 242 includes a scanner in place of the keypad 244, which scanner automatically enters a Universal Product Code (UPC) code for the good or service of interest. In this example, the codes (C1,C2,C3,C4,CN) 224 of the database storage area 222 are UPC codes.

EXAMPLE 22

As an alternative to the foregoing two examples, the codes (C1,C2,C3,C4,CN) 224 of the database storage area 222 are credit and debit card codes, the goods and services (G1,S1, G2,G3,S2) 226 are not specified (or are ignored), and the user enters a code on the keypad 244, such as code 245, which corresponds to the credit or debit card of interest, such as CC2 250.

The use of the single UID, such as 241, to be linked to personal information allows information to be updated centrally and simply referenced by a constant number. For example, a single UID credit/debit card replaces all other credit/debit cards. A member employs the single UID card for purchases at retail establishments and on communication networks. The single UID card is input at a POS terminal or the UID is input into a web page or a wireless device. When inputted, the member is prompted to enter which conventional credit or debit card the user wants charged, and the single UID card automatically charges that credit or debit card of choice.

This example is very advantageous to the member who can simply carry one UID card rather than a bulky collection of numerous different credit and debit cards in the member's wallet or purse. Instead, that collection may be safely stored, for example, at the member's home. Moreover, as discussed above in connection with FIG. 7, in the event of the loss or theft of the single UID card, the user may readily update the access rights in the system database 63 to restrict all access to the conventional credit card information, thereby readily precluding improper use of the UID card by a finder or thief. Here, the member need only take one action to update the UID database, rather than undertaking the laborious and time-consuming task of notifying all of his/her credit and debit card providers.

EXAMPLE 23

In another embodiment, the member defines, in a database storage area, similar to 222 of FIG. 8, what charges would debit the credit or debit card of choice via various charge categories. For example, for one member, all dinning charges are debited to a Diners Club account (e.g., code C1), all hardware charges are debited to a Visa account (e.g., code C2), and a miscellaneous category is provided for transactions that are not categorized (e.g., code C3). Other members can select the same or different selections. For example, another member might choose that all hardware charges are debited to a Master Card account (e.g., code C2).

Each retailer employs a POS terminal which includes a predefined code that is associated with a particular category (e.g., a restaurant employs code C1, a hardware store employs code C2, a grocery store employs code C3). The member's single UID card is scanned and the UID and the predefined code for that retailer are sent to the switch 247 as discussed above in connection with FIG. 8.

Although a relatively simple list of codes has been disclosed, the codes may be expanded to include, for example, a code for a fast food restaurant, a code for "fine dining", and/or unique codes for each individual retailer.

Furthermore, as shown with the link (R1L) 264 of FIG. 8, the member might choose to link a relatively manageable list of codes (e.g., codes C1,C2,C3,C4,CN) to certain goods or services and/or credit cards, while employing a particular credit card (e.g., CC1 266) for any codes (e.g., as represented by the "x" in the sixth row of column 224) which are not defined in the database area 222.

Figure 9:
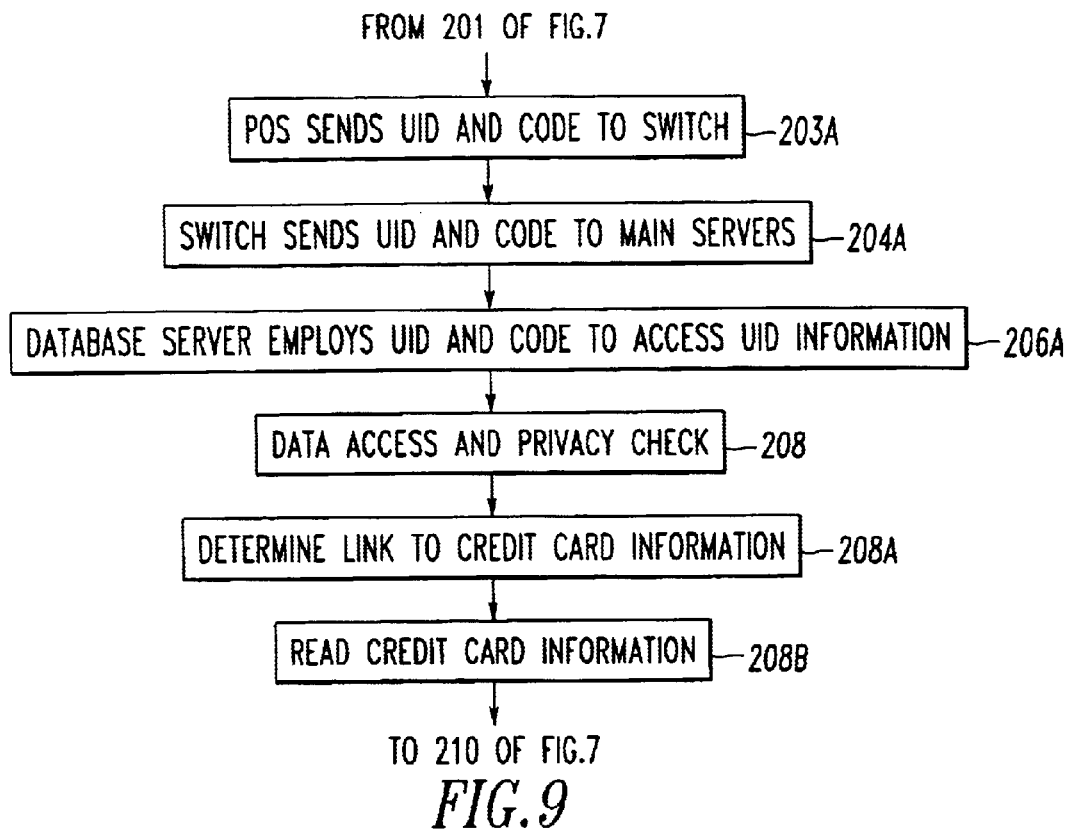
FIG. 9 is a flowchart of a credit card transaction in accordance with another embodiment of the present invention.

FIG. 9 shows an alternative to the flowchart of FIG. 7 in which steps 203, 204 and 206 are replaced by respective steps 203A, 204A and 206A, and steps 208A and 208B are added between steps 208 and 210. At 203A, the POS terminal 202 connects to a credit card switch (credit card processing center) and sends it the unique UID and the unique store code (e.g., the POS terminal is programmed to include a unique predefined store code). Next, at 204A, the switch sends the UID and the unique store code to the main servers 48 of FIG. 3. At 206A, the database server 51 accesses the UID information from the system database 63. Next, at 208, the database server 51 checks data access and privacy of the UID information. Then, at 208A, employing the UID (e.g., UID2 241) and the store code (e.g., C3 245), the appropriate link (e.g., R2L 256) is determined from the database areas 228 and 222. At 208B, the desired credit card name, credit card number, expiration date, bank number and unique bank identifier of the member's conventional credit card (e.g., CC2 250) are read from the corresponding representation (e.g., R2 258). Finally, execution continues, at 210, as discussed above in connection with FIG. 7.

EXAMPLE 24

Figure 10:
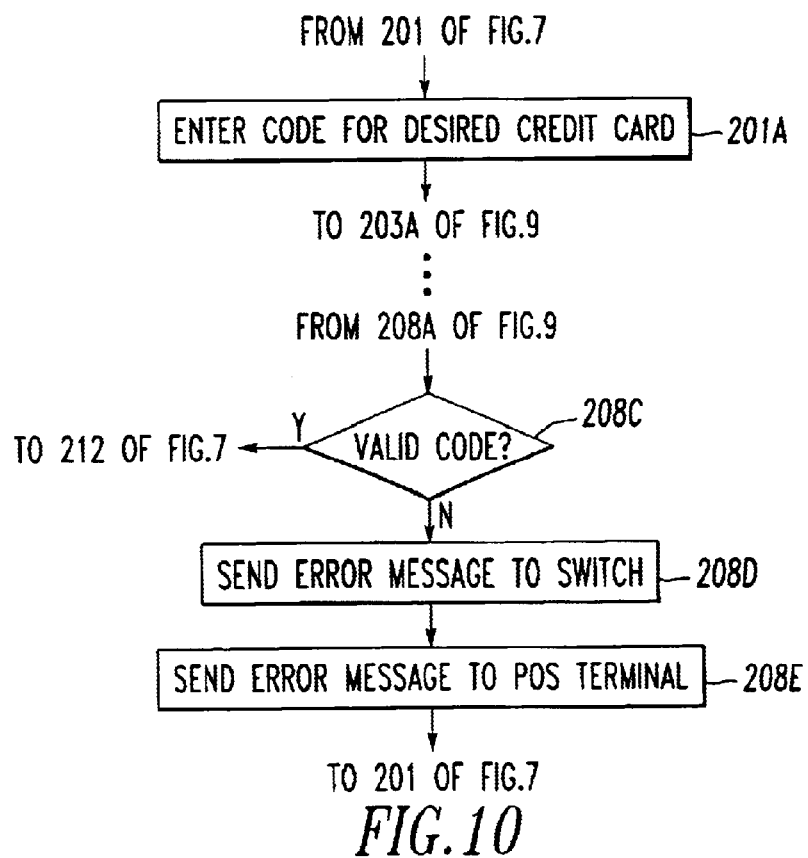
FIG. 10 is a flowchart of a credit card transaction in accordance with another embodiment of the present invention.

FIG. 10 shows an alternative to the flowchart of FIG. 9 in which step 201A is added after step 201 of FIG. 7, and step 208B is replaced by steps 208C, 208D and 208E. At 201A, before the POS terminal 202 connects to a switch (credit card processing center), the member enters (e.g., through a keypad) a code (e.g., code C3 245), which specifies the member's conventional credit or debit card to be charged. Execution continues as shown with steps 203A,204A,206A, 208 and 208A of FIG. 9. Then, at 208C of FIG. 10, based upon the codes (C1,C2,C3,C4,CN) 224 of the database storage area 222 of FIG. 8, it is determined if the member made a valid selection (e.g., whether the entered code C3 245 is one of the stored codes 224). If so, then execution resumes at 212 as discussed above in connection with FIG. 7. Otherwise, if the member entered an invalid code (e.g., such as a code C5 (not shown) which is not one of the stored codes 224), then, at 208D, an error message is sent to the switch. In turn, at 208E, an error message is returned to the POS terminal 202, after which the member repeats steps 201 and 201A, in order to enter a valid code.

EXAMPLE 25

Alternatively, in the foregoing example, the member may simply be prompted to repeat step 201A, in order to re-enter the code of the card to be charged or debited.

EXAMPLE 26

Figure 11:
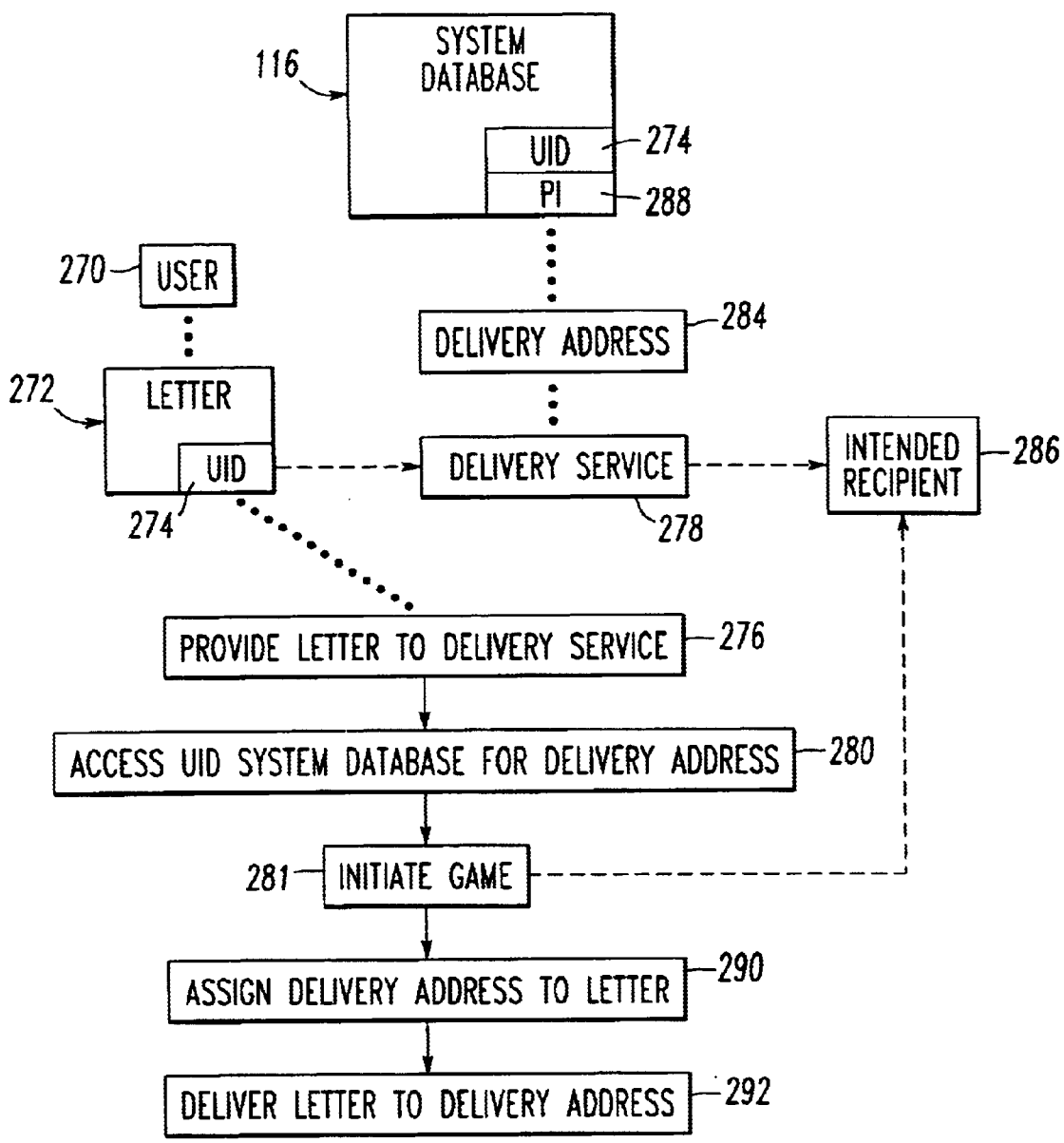
FIG. 11 is a flowchart and block diagram showing a delivery transaction in accordance with another embodiment of the present invention.

Referring to FIG. 11, a delivery transaction employing a UID is shown. A user 270 prepares a letter or package 272 and supplies a UID 274 of the intended recipient. The UID 274 may be applied directly to the letter or package 272 or, alternatively, may be employed in association with a mailing label or waybill (not shown). At 276, the user provides the letter or package 272 to a delivery service (e.g., the United States Postal Service; a commercial courier; a messenger service) 278. At 280, the delivery service 278 accesses the system database 116 of FIG. 4 in order to identify the delivery address 284 of the intended recipient 286 based upon the UID 274 and personal information (PI) 288 in that database 116. At 290, the delivery address 284 is assigned to the letter or package 272, and, at 292, the letter or package 272 is delivered to the delivery address 284.

EXAMPLE 27

As shown in FIG. 11, at 281, a reward (e.g., a game play) may be provided to the intended recipient 286 based upon the access, at 280, to the system database 116.

EXAMPLE 28

Figure 12:
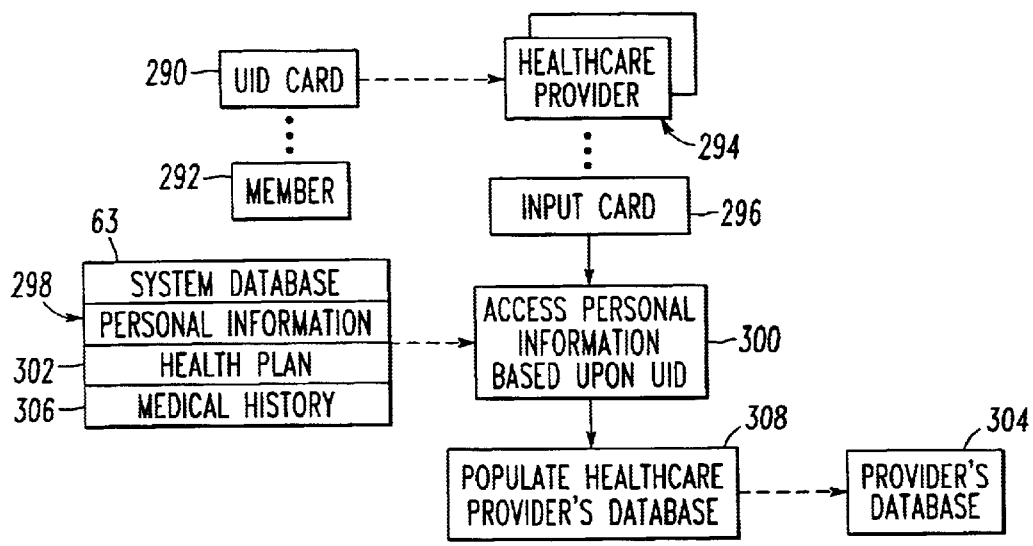
FIG. 12 is a flowchart and block diagram showing a healthcare transaction in accordance with another embodiment of the present invention.

The UID computer system 40 of FIG. 3 may provide a repository of information used to populate data into a healthcare request. FIG. 12 shows a healthcare transaction, which employs a UID insurance card 290. A member 292 may present the UID insurance card 290 to, for example, healthcare providers 294. The UID insurance card 290 is inputted at 296, the member's personal information 298 in the system database 63 is accessed at 300, and the member's health plan 302 is employed to populate the healthcare provider's database 304 along with the member's medical history 306, if the subscriber so chooses, at 308. The member 292 may choose to have additional personal health information provided, such as, for example, prescriptions, medications, allergies, and family medical history. Preferably, a reward (e.g., a game play) is initiated in response to the access of the system database 63 at 300.

EXAMPLE 29

Figure 13:
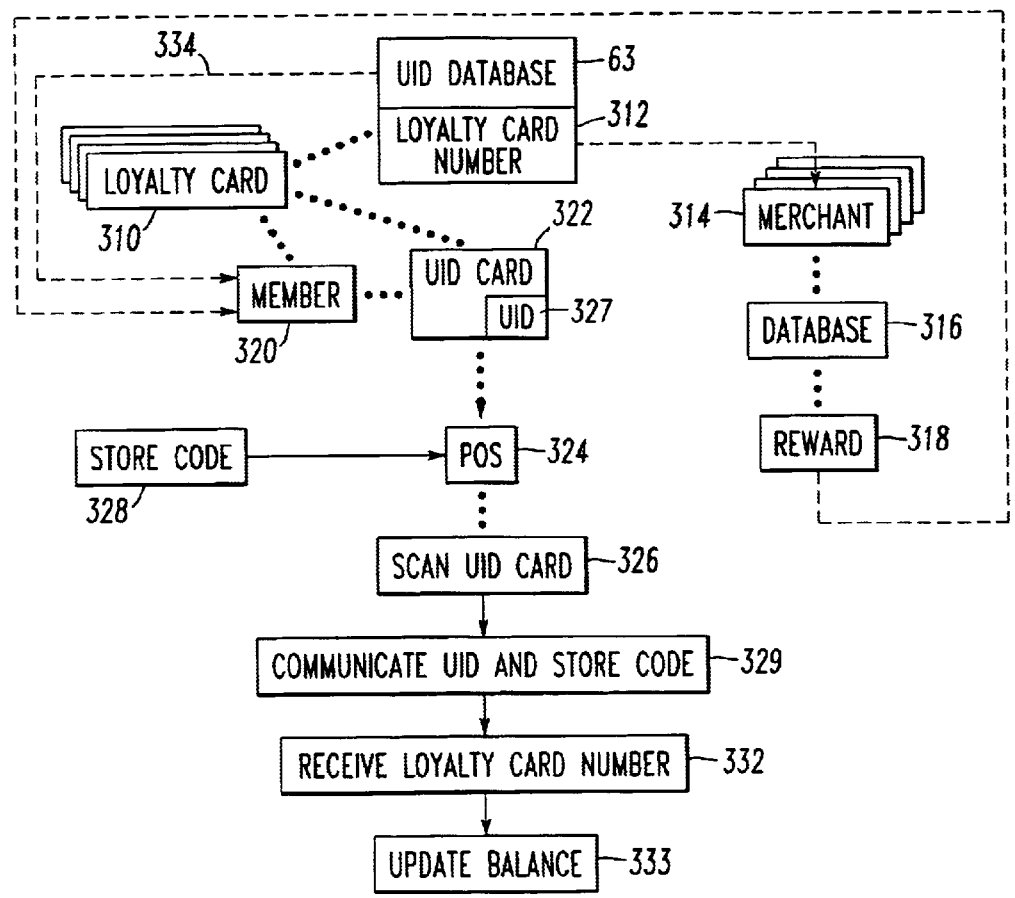
FIG. 13 is a flowchart and block diagram showing a customer loyalty card transaction in accordance with another embodiment of the present invention.

FIG. 13 shows a transaction, which employs a customer loyalty card 310. Much like credit card processing, the UID database 63 of FIG. 3 stores the loyalty card number 312 and returns it to the requesting merchant 314. The merchant 314 uses the returned loyalty card number 312 to access the merchant's database 316 and reward, at 318, the member 320 dependent upon the program that the merchant is running.

A UID card 322 is associated with one or more store loyalty cards, such as 310, each of which offers points and other promotional offers at a corresponding commercial (e.g., retail; e-commerce; on-line Internet shopping) establishment, such as 314. A consumer and member of the computer system 40 of FIG. 3, such as 320, replaces a plurality of different store loyalty cards with a single UID card, such as 322, as his/her "loyalty" card of choice during each of various financial transactions at various establishments.

Similar to a credit or debit card transaction, such as, for example, is discussed above in connection with FIG. 9, the UID card 322 is scanned, at 326, at a POS terminal 324 of the commercial establishment 314, and the UID 327 and the unique store code 328 of the commercial establishment 314 are communicated at 329 to the UID database 63. In turn, the computer system 40 communicates with the database 316 (e.g., local; remote) of the commercial establishment 314, which receives the loyalty card number 312, at 332, in order to credit or debit, at 333, as appropriate, point balances for the customer loyalty card transaction. A reward 334 (e.g., an instant win) is delivered from the computer system 40 of FIG. 3 to the member 320 with each transaction using the UID card 322.

EXAMPLE 30

A UID card is associated with one or more store debit cards, each of which is associated with a particular commercial (e.g., retail; e-commerce; on-line Internet shopping) establishment. A consumer and member of the computer system 40 of FIG. 3, replaces a plurality of different store debit cards with a single UID card as his/her "store debit" card of choice during each of various financial transactions at various establishments.

Similar to a credit or debit card transaction, such as, for example, is discussed above in connection with FIG. 9, the UID card is scanned at a POS terminal of the commercial establishment, and the UID and the unique store code of the commercial establishment are communicated to the UID database. In turn, the computer system 40 communicates with another database (e.g., local, remote) of the commercial establishment, in order to credit or debit, as appropriate, the consumer's store debit card account for the store debit card transaction. A reward (e.g., an instant win) is delivered to the member with each transaction using the UID card.

EXAMPLE 31

If one person wishes to give a store debit card (e.g., a store gift card) to another person, who is a member of the UID computer system 40 of FIG. 3, then the first person simply needs the second person's UID. For example, the giver of the store debit card logs onto the UID web site of the computer system 40, navigates to a gift page, enters the second person's UID into an entry field, selects the retailer associated with the store debit card, selects the value of the store debit card, and provides the first person's credit or debit card information (e.g., a credit card number; a debit card number; a UID). In turn, the computer system 40 communicates with another database (e.g., local; remote) of the commercial establishment, in order to credit the new debit card account with the appropriate value. The system 40 also sends an e-mail message to notify the recipient of the gift of the store debit card of particular value at a particular retailer's store. A reward (e.g., an instant win) is delivered to the member with each transaction using the UID card.

EXAMPLE 32

As an alternative to the foregoing example, one person may purchase a store debit card from a commercial establishment in a convention manner (e.g., by going to a retail store and presenting a conventional credit or debit card to charge or debit the value of the purchased store debit card), except that that person also presents the UID of a second person who is to receive the store debit card as a gift. In turn, an agent (e.g., a sales clerk) of the retail establishment logs onto the UID web site, navigates to a gift page, enters the second person's UID into an entry field, selects the retailer associated with the store debit card, selects the value of the store debit card, and provides suitable payment information. In turn, the computer system 40 communicates with another database (e.g., local; remote) of the commercial establishment, in order to credit the new debit card account with the appropriate value. The system 40 also sends an e-mail notification message to the recipient of the gift. A reward (e.g., an instant win) is delivered to the member with each transaction using the UID card.

EXAMPLE 33

Although the exemplary embodiments of FIG. 2 and Examples 15, 17–25 and 29 disclose conventional credit or debit cards (e.g., cards which employ visual numbers and/or a magnetic strip for reading by a POS terminal), the invention is applicable to RFID (i.e., radio frequency identification) devices and/or infrared (scanning) devices employing wireless communication technology to communicate a UID as part of a communication transaction. For example, a UID is embedded into the string communication transmission from the RFID device or infrared scanning device to the computer system 40 of FIG. 3, in order to uniquely identify the user (e.g., in order to charge/debit a predefined conventional credit and/or debit card; to charge/debit a selected one of a plurality of conventional credit and/or debit cards). As another example, in order to obtain demographic profiling information regarding the member, a commercial establishment employs a RFID device or infrared wireless device. The member employs a corresponding device, such as an electronic tag, which transmits a signal including the member's UID to the receiving device. In turn, the establishment may access the UID database 63 in order to ascertain demographic information about the member, such as purchase behavior and frequency of visits. The computer system 40 then generates a reward for the member.

EXAMPLE 34

As an alternative to the database transaction of FIG. 6 (Example 14), the computer system 40 of FIG. 3 may provide biometrics information (e.g., fingerprint; face; iris; voice; signature recognition; and/or DNA information) as part of the member's personal information.

EXAMPLE 35

As an alternative to the database transaction of FIG. 6 (Example 14) and Examples 33 and 34, the computer system 40 of FIG. 3 may provide biometrics information (e.g., fingerprint; face; iris; voice; signature recognition; and/or DNA information) of a member to a remote authentication system employing a RFID and/or infrared (scanning) device. That device receives a signal, including the member's UID, which signal is transmitted by the member's corresponding device, such as an electronic tag. In turn, the authentication system advantageously employs the biometrics information to authenticate the member (e.g., to permit the member to access a secure area).

EXAMPLE 36

As an alternative to Examples 17–20, 22, 24 and 25, a member employs a wireless device, such as a cell phone or PDA, in suitable communicative proximity to a retail establishment's POS terminal, which is enabled to communicate with that device. The member inputs on the wireless device, such as the cell phone, a selection of which debit or credit card he/she wants to debit or charge. For example, a suitable code is entered through a button on a keypad, or a predefined code is entered and saved in the cell phone. In turn, the code is communicated to the computer system 40 of FIG. 3, the member's corresponding debit or credit card is determined based upon the code and the member's UID, and that debit or credit card is debited or charged for the purchase or lease of a good or service at the retail establishment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breath of the claims appended hereto and any and all equivalents thereof.

What is claimed is:

1. A method for conducting a financial transaction corresponding to a good or service, said method comprising the steps of:

providing a plurality of first credit or debit devices;

associating a unique identifier with each of said first credit or debit devices;

associating one of said first credit or debit devices with a plurality of second credit or debit cards;

employing said one of said first credit or debit devices to initiate said financial transaction;

selecting one of said second credit or debit cards based upon said unique identifier and said good or service; and employing said selected one of said second credit or debit cards to conclude said financial transaction.

2. The method of claim 1 further comprising:
   employing a universal identifier as said unique identifier.

3. The method of claim 2 further comprising:
   providing a reward related to said universal identifier in response to said financial transaction.

4. The method of claim 1 further comprising:
   purchasing said good or service as part of said financial transaction.

5. The method of claim 1 further comprising:
   leasing said good or service as part of said financial transaction.

6. The method of claim 1 further comprising:
   presenting said one of said first credit or debit devices at a point of sale terminal.

7. The method of claim 1 further comprising:
   entering the unique identifier of said one of said first credit or debit devices on a web page.

8. The method of claim 1 further comprising:
   entering the unique identifier of said one of said first credit or debit devices on a wireless communication device.

9. The method of claim 1 further comprising:
   employing a plurality of types of goods or services;
   selecting one of said types of goods or services; and
   selecting one of said second credit or debit cards based upon said selected one of said types of goods or services.

10. The method of claim 1 further comprising:
    associating a plurality of codes with a plurality of goods or services;
    associating at least one of said goods or services with each of said second credit or debit cards;
    selecting one of said goods or services;
    determining the code for said selected one of said goods or services; and
    selecting one of said second credit or debit cards based upon said determined code for said selected one of said goods or services.

11. The method of claim 10 further comprising:
    storing at least some of said codes for said goods or services in a database; and
    accessing said database to select said one of said second credit or debit cards.

12. The method of claim 11 further comprising:
    associating one of said second credit or debit cards with said codes for said goods or services which are not in said database;
    selecting as said selected one of said goods or services one of said goods or services having one of said codes which are not in said database; and
    selecting as said one of said second credit or debit cards said associated one of said second credit or debit cards.

13. The method of claim 1 further comprising:
    selecting one of said first credit or debit devices from the group comprising: a credit card, a debit card, a radio frequency identification device, and an infrared scanning device.

14. The method of claim 1 further comprising:
    associating a plurality of codes with a plurality of commercial establishments;
    selecting one of said commercial establishments;
    purchasing a good or service from said selected one of said commercial establishments;
    determining the code of said selected one of said commercial establishments; and selecting one of said second credit or debit cards based upon said code.

15. A system for conducting a financial transaction, said system comprising:

means for storing a plurality of codes associated with goods or services;

means for storing a plurality of unique identifiers each of which is associated with one of a plurality of first credit or debit devices;

means for associating one of said first credit or debit devices with a plurality of second credit or debit cards;

means for initiating said financial transaction for one of said goods or services with one of said first credit or debit devices;

means for selecting one of said second credit or debit cards based upon the unique identifier of said one of said first credit or debit devices and the code of said one of said goods or services; and means for concluding said financial transaction with said selected one of said second credit or debit cards.

\* \* \* \* \*